United States Patent
Kadam et al.

(10) Patent No.: US 8,663,800 B2
(45) Date of Patent: *Mar. 4, 2014

(54) LIGNIN PRODUCTION FROM LIGNOCELLULOSIC BIOMASS

(75) Inventors: Kiran Kadam, Golden, CO (US);
Michel A. Simard, Berwyn, PA (US);
George Steven Dowe, Greeneville, SC (US)

(73) Assignee: Renmatix, Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,275

(22) Filed: May 4, 2012

(65) Prior Publication Data

US 2012/0282465 A1    Nov. 8, 2012

Related U.S. Application Data

(60) Provisional application No. 61/482,479, filed on May 4, 2011.

(51) Int. Cl.
*B32B 5/16*    (2006.01)

(52) U.S. Cl.
USPC ...... 428/402; 428/532; 428/536; 106/123.11; 106/126.2; 106/163.01; 536/56; 127/57

(58) Field of Classification Search
USPC .......... 428/402, 532, 536; 106/123.11, 126.2, 106/163.01; 536/56; 127/57
See application file for complete search history.

(56) References Cited

U.S. PATENT DOCUMENTS

| | | | |
|---|---|---|---|
| 2,156,159 A | 4/1939 | Olson et al. | |
| 2,994,633 A | 8/1961 | Clark | |
| 2,997,466 A | 8/1961 | Ball et al. | |
| 4,100,016 A | 7/1978 | Diebold et al. | |
| 4,409,032 A | 10/1983 | Paszner et al. | |
| 4,470,851 A | 9/1984 | Paszner et al. | |
| 4,520,105 A | 5/1985 | Sinner et al. | |
| 4,556,430 A | 12/1985 | Converse et al. | |
| 4,645,541 A | 2/1987 | DeLong | |
| 4,742,814 A | 5/1988 | Sinner et al. | |
| 4,764,596 A | 8/1988 | Lora et al. | |
| 5,824,187 A | 10/1998 | Richter et al. | |
| 6,419,788 B1 | 7/2002 | Wingerson | |
| 8,057,639 B2 | 11/2011 | Pschorn et al. | |
| 8,317,928 B1 * | 11/2012 | Iyer et al. | 127/57 |
| 8,404,051 B2 * | 3/2013 | Iyer et al. | 127/57 |
| 2002/0069987 A1 | 6/2002 | Pye | |
| 2007/0259412 A1 | 11/2007 | Belanger et al. | |
| 2008/0032344 A1 | 2/2008 | Fallavollita | |
| 2009/0038212 A1 | 2/2009 | Cooper | |
| 2009/0176286 A1 | 7/2009 | O'Connor et al. | |
| 2010/0043782 A1 | 2/2010 | Kilambi | |
| 2010/0069626 A1 | 3/2010 | Kilambi | |
| 2010/0203605 A1 | 8/2010 | Kim et al. | |
| 2010/0269990 A1 | 10/2010 | Dottori et al. | |

FOREIGN PATENT DOCUMENTS

| | | |
|---|---|---|
| CA | 1284637 | 6/1991 |
| CA | 2701194 | 10/2010 |
| EA | 200700715 | 10/2007 |
| GB | 2145090 | 3/1985 |
| JP | 2006255676 | 9/2006 |
| JP | 2010042604 | 2/2010 |
| RU | 2338769 | 11/2008 |
| SU | 1086046 | 4/1984 |
| WO | 2007009463 | 1/2007 |
| WO | 2007120210 | 10/2007 |
| WO | 2010045576 | 4/2010 |
| WO | 2011007369 | 1/2011 |

OTHER PUBLICATIONS

International Patent Application No. PCT/US2012/036591, "International Search Report and Written Opinion Received", mailed Nov. 30, 2012, 11 pages.
Hosaka, "(Abstract) Filtration of lignin in hydrolysis solution", Hiroshima Daigaku Suichikusangakubu Kiyo, 17(1), 1978, 17-25.
Li et al., "(Abstract) Study on the recovery of lignin from black liquor by ultrafiltration", Huaxue Gongcheng, 31(1), 2003, 49-52.
Marone et al., "Comminution of hydrolytic lignin in a jet mill", Gidroliznaya i Lesokhimicheskaya Promyshlennost, (6), 1991, 14-5.
Shikinaka et al., "Polyfunctional nanometric particles obtained from lignin, a woody biomass resource", Green Chemistry, 12(11), 2010, 1914-6.
Sokolov et al., "(Abstract) Activation of hydrolytic lignin obtained from corncobs", Kozharska i Obuvna Promishlenost, 13(6), 1972, 13-23.
Russian Patent Application No. 2012154207, "Decision to Grant" received Oct. 17, 2013, 17 pages.

* cited by examiner

*Primary Examiner* — Leszek Kiliman
(74) *Attorney, Agent, or Firm* — Ballard Spahr LLP; Travis B. Gasa (57) ABSTRACT

Methods are disclosed for preparing lignin from lignocellulosic biomass using rapid full or partial pressure reduction to separate and pulverize the lignin without fouling the equipment and with improved energy recovery.

17 Claims, 3 Drawing Sheets

LIGNIN PRODUCTION FROM LIGNOCELLULOSIC BIOMASS

CROSS REFERENCE TO RELATED APPLICATIONS

This application claims the benefit of U.S. 61/482,479 filed May 4, 2011, the entire disclosure of which is incorporated by reference.

FIELD OF THE INVENTION

The present invention generally relates to methods of preparing lignin from lignocellulosic biomass. More particularly, it relates to methods of preparing lignin from lignocellulosic biomass using rapid full or partial pressure reduction to separate and to pulverize the lignin without fouling the equipment and with improved energy recovery.

BACKGROUND OF THE INVENTION

Existing processes delignify lignocellulosic biomass before entering the cellulose conversion process using solvents or other chemicals. In such delignification processes, complex equipment is typically required and is expensive to operate because of the solvent or chemical usage and lack of recovery methods. In other existing processes, the solid conversion of lignocellulosic biomass in pre-treatment and hydrolysis requires high temperatures to fully or partially solubilize the lignin present. Upon cooling, the lignin precipitates from solution. The lignin may be recovered from the process and burned for thermal energy. The particle size of the recovered lignin may be variable and too large for efficient burning, thus requiring a separate pulverizing step. Furthermore, as the lignin in solution cools, it becomes sticky (typically in the glass transition temperature range of lignin, which is about 100° C. under ambient pressure) and tends to foul the process equipment to the point of making the process inoperable. It would be useful to have methods for providing lignin of a substantially uniform, small particle size for improving burning efficiency, for enhanced properties for the use of lignin as a feedstock for the production of other chemicals, and for avoiding typical equipment fouling problems. It would also be useful to maximize energy recovery. The methods and compositions of the present invention are directed toward these, as well as other, important ends.

SUMMARY OF THE INVENTION

In one embodiment, the invention is directed to methods of preparing lignin from lignocellulosic biomass, comprising:
providing lignocellulosic biomass at a first pressure and at a first temperature, said lignocellulosic biomass comprising:
a first solid fraction comprising:
insoluble lignin; and
a first liquid fraction comprising:
soluble $C_6$ saccharides; and
soluble lignin;
reducing said first temperature of said lignocellulosic biomass to a second temperature at least about 1° C. above the glass transition temperature of lignin under said first pressure; and
reducing said first pressure of said lignocellulosic biomass at said second temperature to a second pressure in a time less than about 1 second to precipitate said soluble lignin in said first liquid fraction and form a mixture comprising:
a second solid fraction comprising:
insoluble lignin; and
precipitated lignin; and
a second liquid fraction comprising:
soluble $C_6$ saccharides;
wherein the average particle size of said insoluble lignin and precipitated lignin is less than about 500 microns.

In another embodiment, the invention is directed to lignin products produced by the methods of the invention.

In another embodiment, the invention is directed to compositions, comprising:
lignin having an average size of no greater than about 500 micron;
wherein said lignin is processed from lignocellulosic biomass using supercritical or near critical fluid extraction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

As employed above and throughout the disclosure, the following terms, unless otherwise indicated, shall be understood to have the following meanings As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, the phrase "substantially free" means have no more than about 1%, preferably less than about 0.5%, more preferably, less than about 0.1%, by weight of a component, based on the total weight of any composition containing the component.

As used herein, the term "saccharification" and "saccharified" refers to the breakdown of polysaccharides to smaller polysaccharides, including oligosaccharides, and monosaccharides, whether through hydrolysis, the use of enzymes, or other means, generally into a liquid fraction and a solid fraction.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state.

As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "continuous" indicates a process which is uninterrupted for its duration, or interrupted, paused or suspended only momentarily relative to the duration of the process. Treatment of biomass is "continuous" when biomass is fed into the apparatus without interruption or without a substantial interruption, or processing of said biomass is not done in a batch process.

As used herein, "resides" indicates the length of time which a given portion or bolus of material is within a reaction zone or reactor vessel. The "residence time," as used herein, including the examples and data, are reported at ambient conditions and are not necessarily actual time elapsed.

As used herein, the term "substantial free of" refers to a composition having less than about 1% by weight, preferably less than about 0.5% by weight, and more preferably less than about 0.1% by weight, based on the total weight of the composition, of the stated material.

As used herein, the term "glass transition temperature" or "Tg" means the temperature at which an amorphous material changes from a brittle, vitreous state to a plastic state. It is dependent upon the composition of the material being tested, including moisture content, the extent of annealing, and the pressure exerted on the material. Glass transition temperature may be measured by differential scanning calorimetry, thermomechanical analysis, dynamic mechanical analysis, and the like.

As used herein, "pulverize" means providing a small particle size, such as through spraying or atomizing, or reducing the particle size of a given material, whether or not through the use of mechanical means.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides).

Generally, the methods of the invention precipitate out and pulverize (provide as a small particle size or reduce the particle size) lignin and avoid fouling of the process equipment while maximizing heat recovery. This is accomplished by cooling the stream containing the lignin to just above its glass transition temperature (Tg) to prevent sticking and then rapidly dropping the pressure so that the lignin is well below its Tg at the new pressure when it precipitates out of solution at a small particle size.

Accordingly, in one embodiment, the invention is directed to methods of preparing lignin from lignocellulosic biomass, comprising:
  providing a lignocellulosic biomass at a first pressure and at a first temperature, said lignocellulosic biomass comprising:
    a first solid fraction comprising:
      insoluble lignin; and
    a first liquid fraction comprising:
      soluble $C_6$ saccharides; and
      soluble lignin;
  reducing said first temperature of said lignocellulosic biomass to a second temperature at least about 1° C. above the glass transition temperature of lignin under said first pressure; and
  reducing said first pressure of said lignocellulosic biomass at said second temperature to a second pressure in a time less than about 1 second to precipitate said soluble lignin in said first liquid fraction and form a mixture comprising:

a second solid fraction comprising:
   insoluble lignin; and
   precipitated lignin; and
a second liquid fraction comprising:
   soluble $C_6$ saccharides;
wherein the average particle size of said insoluble lignin and precipitated lignin is less than about 500 microns.

Figure 1:
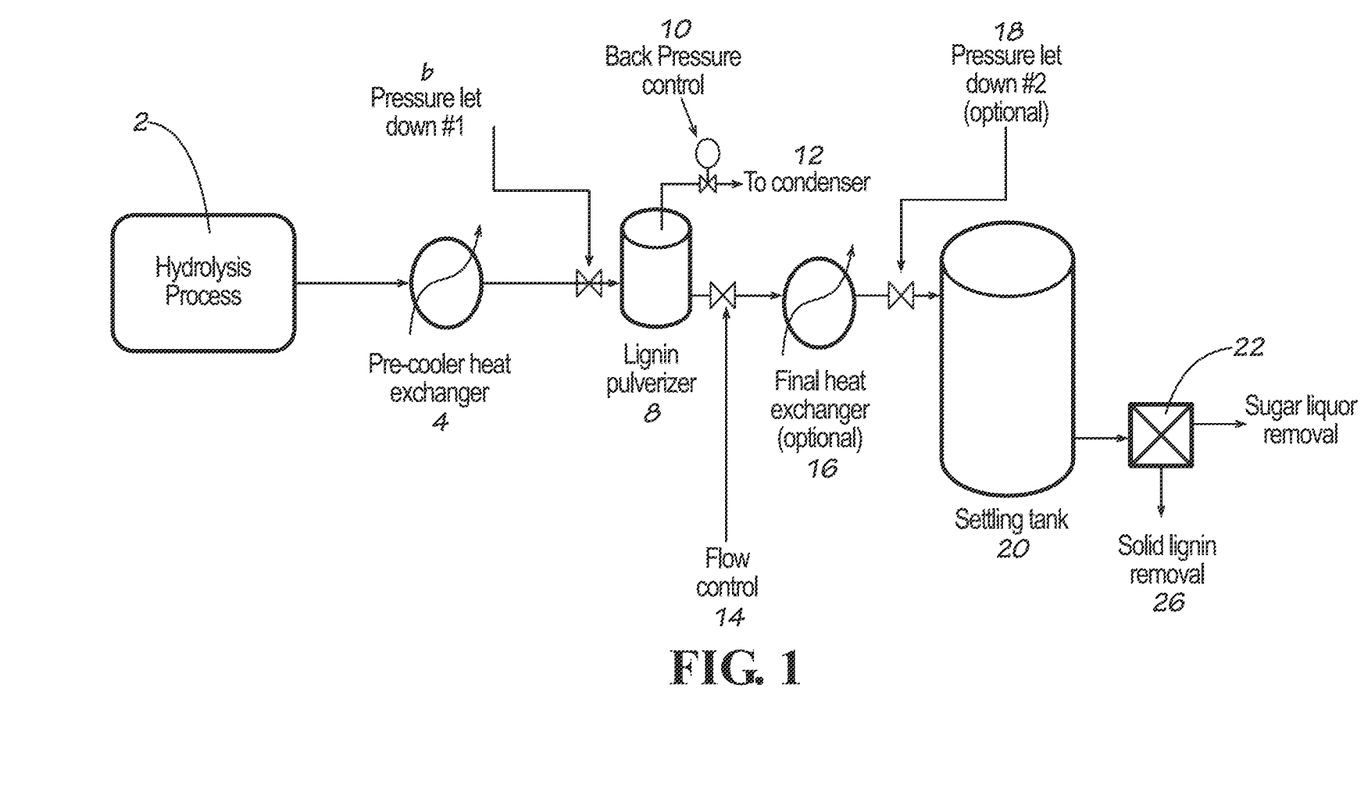
FIG. 1 is a schematic diagram of the method of producing lignin from cellulosic biomass in one embodiment of the invention.

A schematic of one embodiment of the invention is shown in FIG. 1. The lignin slurry exits the hydrolysis process 2. It is cooled to just above its glass transition temperature to maximize heat recovery, for example, in a pre-cooler heat exchanger 4. The lignin slurry is then subjected to a rapid pressure drop, for example, through the pressure letdown valve 6, and subsequently the liquid (i.e., water) content in the slurry is flash evaporated. This results in the sudden precipitation of the soluble lignin into fine particles inside the lignin pulverizer 8. In certain embodiments, the pulverizer is of relatively small volume to keep the slurry moving and avoid lignin settling. In other embodiments, it may be of a large volume to permit settling of the lignin, which may be recovered by mechanical means, especially when using full flash. The inlet pipe to the pulverizer may either be above, below, or to either side of the pulverizer. Atmospheric pressure for full pressure reduction, or an intermediate pressure in the case of a partial pressure reduction, is maintained in the pulverizer by the back pressure control valve 10. In embodiments using full flash to atmospheric pressure, no back pressure control is needed. Any recovered steam enters a condenser 12 (not shown) for heat recovery. Following the pulverizer, the slurry flows through flow control 14 and then is further cooled to recover more heat in a heat exchanger 16, and is reduced to atmospheric pressure, if not yet at atmospheric temperature, via a pressure letdown valve 18 in the settling tank 20. In the tank, the lignin is permitted to settle to the bottom. Finally, the slurry may be passed through a solid/liquid filtration apparatus 22 for final separation of liquor 24 and lignin 26.

Advantages of the methods of the invention are that the pulverization (preparation of small particles and/or reduction in average particle size) of soluble and insoluble lignin improves handling, accelerates the drying, and improves combustion of the lignin. Another advantage of the methods of the invention is that the glass transition phase of the lignin, both soluble and insoluble, is avoided, to avoid fouling of the process equipment and permit pulverization of the lignin.

In certain embodiments of the method, lignocellulosic biomass is fractionated to remove at least a portion of $C_5$ saccharides by any suitable means, including, but not limited to, hydrothermal treatment (such as hot compressed water, subcritical, near critical, or supercritical water, which may contain other fluids, including alcohol, acid, or base), enzymatic treatment, and the like.

In certain embodiments of the method, the average particle size of said insoluble lignin and precipitated lignin is less than about 500 microns.

The methods of the invention are preferably run continuously, although they may be run as batch or semi-batch processes.

The methods of the invention may be carried out in any suitable reactor, including, but not limited to, a tubular reactor, a digester (vertical, horizontal, or inclined), and the like. Suitable digesters include the digester system described in U.S. Pat. No. 8,057,639, which include a digester and a steam explosion unit, the entire disclosure of which is incorporated by reference.

In certain embodiments, the method further comprises the step of reducing the temperature of said mixture. All of the embodiments of the invention involve a temperature reduction from the temperature at which the saccharified lignocellulosic biomass is provided, typically about 280° C. to about 375° C. (hydrolysis temperature) to eventually ambient or near ambient temperatures, typically about 20° C. to about 60° C. The key of the temperature reduction is that the temperature is reduced instantaneously across the glass transition temperature range of the lignin to permit pulverization of the lignin.

In embodiments where there is a partial pressure reduction in the method, the second pressure is greater than atmospheric pressure.

In embodiments where there is a full pressure reduction in the method, the second pressure is about atmospheric pressure.

In certain embodiments, the method further comprises the step of reducing the pressure on said mixture to a third pressure. Pressure control impacts temperature in the flashing process where the saccharified lignocellulosic biomass is cooled in a very short period of time (e.g., less than one second). The inlet pressure must be equal to or greater than the saturation pressure at the given temperature so that the liquid components of fraction remain as liquids. With respect to processing of lignocellulosic biomass, it is preferably to avoid the temperature range of about 180° C. and about 240° C., the glass transition temperature range of lignin under typical processing conditions. Thus, if the inlet temperature is at least the 240° C.+1° C., then the minimum inlet pressure needs to be about 34 bar but may be much higher. For example, it is typical to have the inlet pressure at 40 bar. The exit temperature is determined and dependent upon the exit pressure. If, for example, there is flash cooling of the saccharified lignocellulosic biomass down to a temperature of 180° C., then the exit pressure needs to equal to the saturation pressure at 180° C., which about 10 bar. The exit pressure is controlled by the back pressure valve, and the exit temperature is determined by the exit pressure. If the exit pressure is changed, the exit temperature will also change. The exit temperature is the saturation temperature at the selected pressure.

In certain embodiments, the method further comprises the step of permitting said insoluble lignin and said precipitated lignin, where the lignin has been pulverized (provided as a small particle size or reduce the particle size) to separate out by gravity.

In certain embodiments, the method further comprises the step of separating said second solid fraction and said second liquid fraction. Suitable separation methods including filtration methods well known to those skilled in the art, such as decanter filters, filter press, reverse osmosis and nanofiltration, centrifuge decanters, and the like.

In certain embodiments, the method further comprises the step of recovering heat using at least one heat exchanger, for example, using a pre-cooler heat exchanger 4 or final heat exchanger 16.

In another embodiment, the invention is directed to lignin products produced by the methods of the invention, including fuels, such as those used in a process heat boiler. The lignin product may also be used as a functional replacement for phenol, as a functional replacement for polyol, or as a building block for carbon fiber. In other embodiments, the compositions of the invention comprising lignin may be utilized in a variety of applications, including, but not limited to, fuels, tackifiers, phenol formaldehyde resin extenders in the manufacture of particle board and plywood, in the manufacture of molding compounds, urethane and epoxy resins, antioxidants, controlled-release agents, flow control agents, cement/concrete mixing, plasterboard production, oil drilling, general dispersion, tanning leather, road covering, vanillin production, dimethyl sulfide and dimethyl sulfoxide production, phenol substitute in phenolic resins incorporation into polyolefin blends, aromatic (phenol) monomers, additional miscellaneous monomers, carbon fibers, metal sequestration in solutions, basis of gel formation, polyurethane copolymer—as a renewable filler/extender, and the like.

In another embodiment, the invention is directed to compositions, comprising:
lignin;
wherein said lignin is processed from lignocellulosic biomass using supercritical or near critical fluid extraction.

In preferred embodiments, the composition is substantially free of organic solvent. In preferred embodiments, the lignin product has an average particle size less than about 500 microns, more preferably, less than 300 microns, even more preferably, less than about 250 microns, and yet even more preferably less than about 50 microns. The particle size of the lignin may be measured by standard sieve shaker, microscopy, light scattering, laser diffraction, and other standard size analysis techniques.

In a preferred embodiment, the lignin has a heating value as measured by ASTM-D240 of at least about 5,000 BTU/lb at 30% moisture content. In a preferred embodiment, the lignin has a heating value as measured by ASTM-D240 of at least about 7,500 BTU/lb at 15% moisture content. In a preferred embodiment, the lignin has a heating value as measured by ASTM-D240 of at least about 8,000 BTU/lb at 5% moisture content.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

Pretreatment (fractionation) and cellulose hydrolysis processes liberate lignin from lignocellulosic biomass utilized as feedstock. For testing in this example, lignin samples, which were generated from the flashing of cellulose effluent, were tested to determine heating value, proximate, ultimate, and ash fusion temperature, ash oxide composition, moisture content, and particle size.

Drying Rate and Moisture Content

When the lignin is separated from the flashed cellulose hydrolysis effluent glucose stream utilizing gravity and 20 µm filter paper, it has an average moisture content between 65% and 75%, by weight. This can be further reduced by using a centrifuge or vacuum filtration unit to more effectively separate the solids from the mother liquor. The representative lignin sample was obtained from the sludge collected in the bottom of the glucose product tank, whose product was generate from multiple runs of 100 mesh wood flour at the cellulose hydrolysis conditions of about 225 bar and 375° C. The sample was subsequently allowed to air dry to measure its drying rate.

Figure 2:
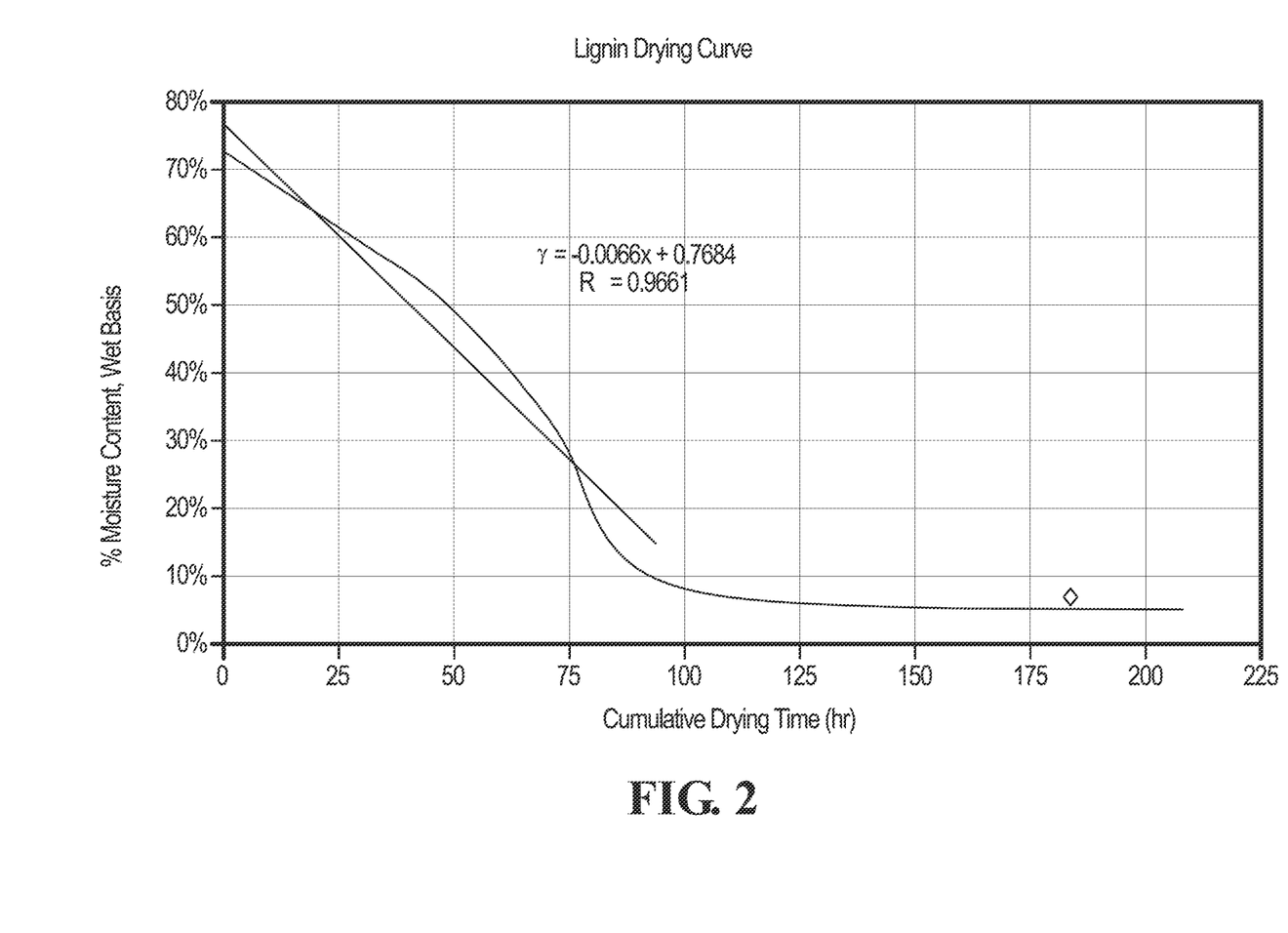
FIG. 2 is a plot of % moisture content (wet basis) as a function of cumulative drying time in hours for lignin.

The results are shown in FIG. 2. The curve indicates that the lignin dries to 10% moisture content, by weight, settling around 5%, by weight, after approximately 105 hours. This was drier than expected and may have been due to the location (inside plant) where the drying experiments were conducted. Ambient conditions were warmer and drier than would be anticipated if the lignin were dried outside where solar insulation, diurnal temperature changes, humidity, and precipitation would be expected to keep the final moisture content between 20% and 25%, by weight. The first 75 hours of drying follows a typical constant rate drying period with moisture moving to the particle surface sufficiently fast to maintain a saturated condition at the surface. This indicates that the rate of drying is controlled by the rate of heat transferred to the evaporating surface. The lower part of the curve, from 75 to 125 hours, is typical of a continuously changing drying rate (usually decreasing) indicating a change in the controlling mechanism for drying. The surface area of the particle can no longer remain fully saturated and evaporation begins shifting into the particle interior where the internal particle water diffusion rate begins to control the drying process.

Heating Value

The heating values of the lignin at various moisture contents were analyzed. The heating value of a fuel is the measure of the heat released during its complete combustion with oxygen. Any fuel will contain hydrogen, and water will be formed as a product of combustion when hydrogen is burned in air. This generated water may remain the vapor state or condense to liquid creating a substantial difference in the measured heat value due to the latent heat of vaporization associated with the phase change. When determining the heat given up by a unit of fuel, the higher (or gross) heating value (HHV) is usually reported where it is assumed than any water generated is all condensed, thus the heating value incorporates the latent heat of vaporization. For the lower (or net) heating value (LHV), none of the water is assumed to have condensed and all of the products of combustion remain is the gaseous state. The HHV may be determined using an oxygen bomb calorimeter and is expressed in terms of heat related per unit weight of fuel ($Btu/lb_f$). Determination of LHV may be calculated from the following equation:

$$HHV = LHV + nHvp$$

where:
HHV=fuel high heating value ($Btu/lb_f$)
LHV=fuel high heating value ($Btu/lb_f$)
n=stoichiometric mass of water generated per mass of fuel combusted ($lb_w/lb_f$)
Hvp=latent heat of vaporization of water ($Btu/lb_w$)

Figure 3:
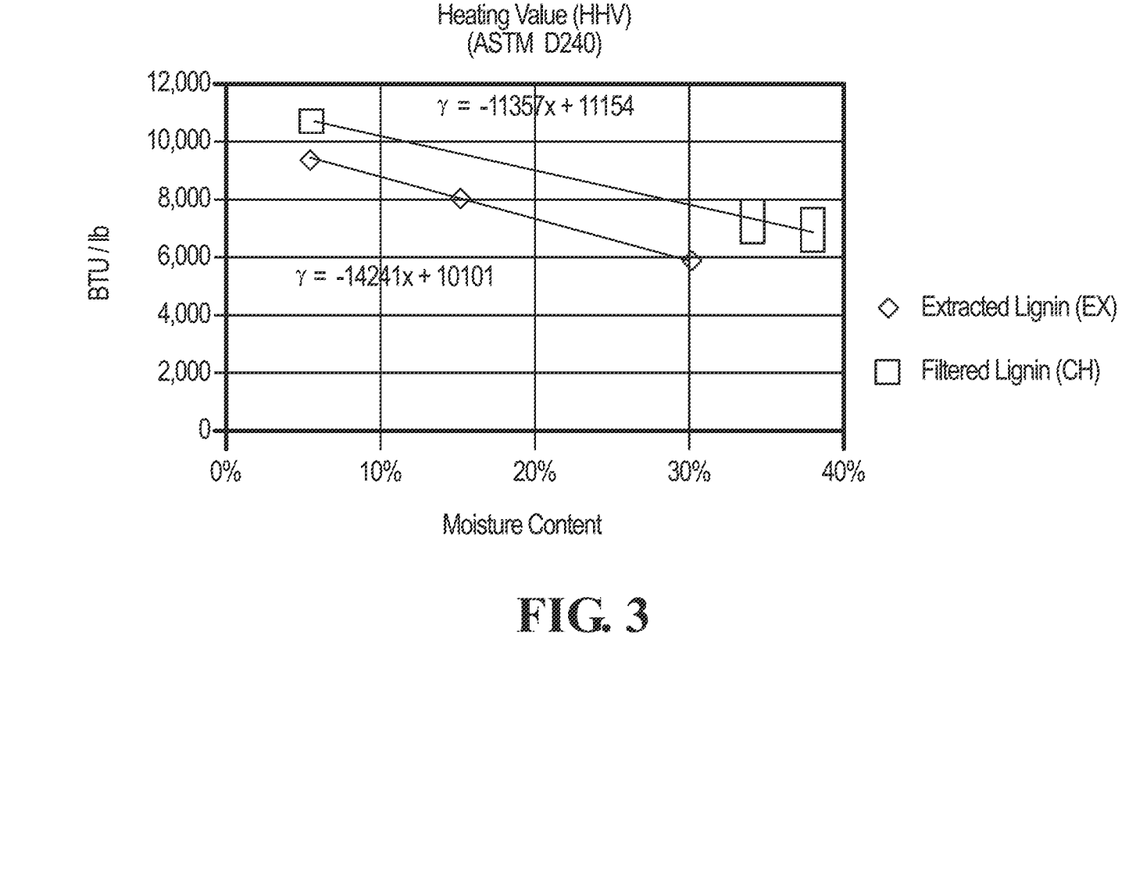
FIG. 3 is a plot of high heating value (HHV) as a function of moisture content for extracted lignin and filtered lignin.

The results of testing using an oxygen bomb calorimeter in accordance with ASTM Method D240 are shown in FIG. 3 for extracted lignin and filtered lignin. The heating value data decreases with increasing moisture content. The filtered lignin is the lignin obtained from flashing the cellulose hydrolysis effluent to atmospheric conditions. The extracted lignin was extracted from the fractionation slurry utilizing ethanol. The average heating value for the filtered lignin at 25% moisture content is approximately 8,200 Btu/lb.

Particle Size

Surface area/mass ratio for discrete particles is an important aspect of the lignin's usefulness as a fuel because it impacts combustion efficiency, boiler design, and method of introduction of combustion air. Improperly sized fuel may not burn completely and heat energy can be lost in the form of carbon rich bottom and/or fly ashes. Measuring particle size may be done by classification, e.g., sieving, or by observing under a microscope a representative sample and comparing to an appropriate scale. The average particle size was determined using a Magnaview DC5-153 microscope and a calibrated scaling slide. The average particle diameter observed was 10 μm to 30 μm at 37% moisture content for separated solids derived from cellulose hydrolysis, where the solids were determined to be approximately 80% lignin.

Proximate Analysis

Proximate analysis of a fuel describes the volatiles, fixed carbon, moisture content, and ash present in a fuel as a percentage of dry fuel weight. The percentages of volatiles and fixed carbon both have a direct impact on the heating value of the fuel, flame temperature, and combustion process in general. Other than carbon and metals, all other fuels burn as a gas. The percentage of volatiles represents the amount of fuel that would burn in the gas phase with the remaining carbon burning as a solid on the grates or as a fine particulate. The ash content is important in the design of air pollution control equipment, boiler grates, and bottom ash handling equipment.

The results for a single sample are shown in Table 1.

TABLE 1

| Sample No. | % Moisture Content | % Ash Content | % Volatile Matter | % Fixed Carbon |
|---|---|---|---|---|
| 1 | 18.57 | 0.44 | 56.75 | 24.24 |

Ultimate Analysis

Ultimate analysis of a fuel describes its elemental composition as a percentage of the fuel sample's dry weight. The main elements typically considered are carbon (C), hydrogen (H), nitrogen (N), sulfur (S), and oxygen (O), and while not an element, ash. Sulfur and ash percentages are particularly important because they are needed to accurately estimate air emission rates for sulfur dioxides ($SO_x$) and particulate matter (PM) for use in effective design of air pollution control equipment and air permitting.

The results for a single sample are shown in Table 2.

TABLE 2

| Sample No. | % C | % H | % N | % O (by difference) | % S | % Ash |
|---|---|---|---|---|---|---|
| 1 | 51.00 | 6.56 | 0.15 | 41.74 | 0.02 | 0.44 |

Ash Fusion Temperature

Ash fusion temperatures are determined by viewing a mounded specimen of the fuel's (lignin) ash through an observation window in a high-temperature furnace in both reducing and oxidizing atmospheres. The ash, in the form of a cone, pyramid, or cube, is heated steadily above 1000° C. to as high a temperature as possible, preferably 1600° C. (2910° F.). The following temperatures are then recorded:

Initial deformation temperature (IT): This is reached when the point of the mound first begins to deform and round.

Softening (spherical) temperature (ST): This is reached when the top of the mound takes on a spherical shape, i.e., the base of the cone is equal to its height.

Hemispherical temperature (HT): This is reached when the entire mound takes on a hemispherical shape, i.e., the base of the cone is twice its height.

Flow (fluid) temperature (FT): This is reached when the molten ash collapse to a flattened button on the furnace floor, i.e., spread to a fused mass.

Generally, a temperature under reducing should be equal to or lower than the corresponding temperature under oxidizing conditions. The difference in these temperatures generally increases with increasing iron content in the ash. Fusion temperatures should monotonically increase in order of IT, ST, HT, and FT.

The results for a single sample in an oxidizing atmosphere are shown in Table 3.

TABLE 3

| | |
|---|---|
| Initial deformation temperature (IT): | 2136° F. (1169° C.) |
| Softening (spherical) temperature (ST): | 2141° F. (1172° C.) |
| Hemispherical temperature (HT): | 2143° F. (1173° C.) |
| Flow (fluid) temperature (FT): | 2144° F. (1174° C.) |

A spherical temperature, a critical temperature for fuel evaluation, that is too low will cause slagging problems in the combustion chamber of a boiler. As the ash softens and melts, it subsequently impacts a surface within the combustion chamber where it cools and forms a glassy substance called clinker, which must be removed. Its removal severely impedes boiler operations as the boiler must be shutdown. If the melted ash cools on a heat transfer surface, the resultant layer builds up, fouling the heat exchanger decreasing its overall efficiency and thus the boiler efficiency as well. It is preferred to have an ST of 35° C. to 65° C. (100° F. to 150° F.) above the actual flue gas temperature peak at the combustion chamber exit to minimize the impact.

The ash fusion temperature gives an indication of its softening and melting behavior.

Ash Mineral Oxide Analysis

Ash mineral oxide composition is also useful in understanding how the ash generated by the combustion of lignin will behave in the combustion chambers of the biomass boiler. Composition does affect the ranges of fusion temperatures, particularly the iron levels and base to acid oxide rations. Typical analyses determine the weight percentage of the following mineral oxides silica ($SiO_2$), alumina ($Al_2O_3$), ferric oxide ($Fe_2O_3$), titanium dioxide ($TiO_2$), phosphorous pentoxide ($P_2O_5$), calcium oxide (CaO), magnesium oxide (MgO), manganese oxide (MnO), sodium oxide ($Na_2O$), potassium oxide ($K_2O$), and sulfur trioxide ($SO_3$). The silica, alumina, and titanium dioxide make up the group of acidic oxides with the remaining compounds forming the basic oxides.

The results for a single sample are shown in Table 4.

TABLE 4

| Sample No. | % Al as $Al_2O_3$ | % Ca as CaO | % Fe as $Fe_2O_3$ | % Mg as MgO | % Mn as MnO | % P as $P_2O_5$ | % K as $K_2O$ | % Si as $SiO_2$ | % Na as $Na_2O$ | % Ti as $TiO_2$ | % S as $SO_3$ | % Sum |
|---|---|---|---|---|---|---|---|---|---|---|---|---|
| 1 | 7.52 | 18.56 | 22.30 | 1.57 | 0.19 | 1.05 | 1.20 | 29.18 | 1.19 | 3.67 | 13.15 | 99.56 |

Table 5 shows a side-by-side comparison for a typical high-rank eastern Kentucky coal, a typical hardwood, and the cellulose hydrolysis-derived lignin.

TABLE 5

| Characteristic | Eastern Kentucky Coal | Typical Hardwood | Cellulose Hydrolysis-derived Lignin |
|---|---|---|---|
| Heating value (Btu/lb) | 13254 @ 5% MC | 8839 (oven dried) | 8200 @ 25% MC |
| Proximate Analysis | | | |
| % Moisture content | 1.2 | 45.6 | 18.57 |
| % Ash | 10.15 | 0.45 | 0.44 |
| % Volatile matter | 36.82 | 48.58 | 56.75 |
| % Fixed carbon | 53.03 | 5.52 | 24.24 |
| Ultimate Analysis | | | |
| % C | 75.0 | 51.64 | 51.09 |
| % H | 7/0 | 6.26 | 6.56 |
| % N | 1.0 | 0 | 0.15 |
| % S | 3.0 | 0.009 | 0.02 |
| % O (by difference) | 6.2 | 41.45 | 41.74 |
| % Ash | 7.8 | 0.65 | 0.44 |
| Ash fusion temperatures (oxidizing) | | | |
| IT (° F.) | 1627 | | 2136 |
| ST (° F.) | 1647 | 1652 | 2141 |
| HT (° F.) | 1649 | | 2143 |
| FT (° F.) | 1649 | | 2144 |
| Ash mineral oxide analysis | | | |
| % Al as $Al_2O_3$ | 30.67 | 0.03 | 7.52 |
| % Ca as CaO | 1.16 | 31.35 | 18.56 |
| % Fe as $Fe_2O_3$ | 4.87 | 0.09 | 22.30 |
| % Mg as MgO | 0.42 | 7.57 | 1.57 |
| % P as $P_2O_5$ | 0.13 | 0.56 | 1.09 |
| % K as $K_2O$ | 0.99 | 10.25 | 1.20 |
| % Si as $SiO_2$ | 58.20 | 0.13 | 29.18 |
| % Na as $Na_2O$ | 0.17 | 0.06 | 1.18 |
| % Ti as $TiO_2$ | 2.08 | — | 3.67 |
| % S as $SO_3$ | 1.29 | 1.21 | 13.15 |

As can be seen, the lignin's HHV is better than typical hardwood (allowing for moisture content), but not quite as high as coal. However, the lignin is considered to be a relatively high energy density fuel. With better than 55% of the lignin representing volatile matter and less than 0.50% ash, most of the lignin is expected to combust and exit the combustion chamber in the gaseous phase, minimizing the size of the ash handling equipment needed in the biomass boiler.

ST is much greater than the average of the hardwood. This is expected to help minimize the impact of slagging on the combustion chamber walls. The elevated ST is likely related to the relatively high iron and calcium content in the ash. The ash fusion temperature is important to boiler operations and efficiency.

From an air pollution control standpoint, $NO_x$ formation (specifically fuel $NO_x$) is expected to be minimal as the nitrogen content of the lignin is very low. The same is true for particulate matter (PM).

Overall, the results indicate that the cellulose hydrolysis-derived lignin has fuel properties that will allow it to be effectively combusted in a process boiler. In particular, the HHV, % volatile matter, spherical temperature (ST), and ash mineral oxide concentrations are particularly conducive for lignin being used as a boiler fuel.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method of preparing lignin from lignocellulosic biomass, comprising:
    providing lignocellulosic biomass at a first pressure and at a first temperature, said lignocellulosic biomass comprising:
        a first solid fraction comprising:
            insoluble lignin; and
        a first liquid fraction comprising:
            soluble $C_6$ saccharides; and
            soluble lignin;
    reducing said first temperature of said lignocellulosic biomass to a second temperature at least about 1° C. above the glass transition temperature of lignin under said first pressure; and
    reducing said first pressure of said lignocellulosic biomass at said second temperature to a second pressure in a time less than about 1 second to precipitate said soluble lignin in said first liquid fraction and form a mixture comprising:
        a second solid fraction comprising:
            insoluble lignin; and
            precipitated lignin; and
        a second liquid fraction comprising:
            soluble $C_6$ saccharides.

2. A method of claim 1,
    wherein said method is continuous.

3. A method of claim 1, further comprising:
    reducing the temperature of said mixture.

4. A method of claim 1, further comprising:
    permitting said insoluble lignin and said precipitated lignin to separate out by gravity.

5. A method of claim 1, further comprising:
    separating said second solid fraction and said second liquid fraction.

6. A method of claim 1,
    wherein said second pressure is greater than atmospheric pressure.

7. A method of claim 6, further comprising:
    reducing the second pressure to atmospheric pressure.

8. A method of claim 1,
    wherein said second pressure is atmospheric pressure.

9. A method of claim 1, further comprising:
    recovering heat using at least one heat exchanger.

10. A method of claim 1,
    wherein said lignocellulosic biomass is fractionated to remove at least a portion of $C_5$ saccharides prior to said providing step.

11. A method of claim 1,
    wherein the average particle size of said insoluble lignin and precipitated lignin is less than about 500 microns.

12. A method of claim 10,
    wherein said fractionation comprises a hydrothermal treatment or enzymatic treatment.

13. A method of claim 12,
wherein said fractionation comprises hydrothermal treatment, and said hydrothermal treatment comprises hot compressed water, subcritical water, near critical water, or supercritical water.

14. A method of claim 13,
wherein said hydrothermal treatment further comprises an alcohol, an acid, or a base.

15. A method of claim 1,
wherein said first liquid fraction comprises water.

16. A method of claim 1,
wherein said first temperature is about 280° C. to about 375° C.

17. A method of claim 3,
wherein the temperature of said mixture is reduced to about 20° C. to about 60° C.

* * * * *